(12) United States Patent
Kim et al.

(10) Patent No.: US 8,703,327 B2
(45) Date of Patent: Apr. 22, 2014

(54) RECHARGEABLE BATTERY AND MANUFACTURING METHOD THEREOF

(75) Inventors: Taewon Kim, Suwon-Si (KR); Yooeup Hyung, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 927 days.

(21) Appl. No.: 12/270,558

(22) Filed: Nov. 13, 2008

(65) Prior Publication Data
US 2009/0317712 A1    Dec. 24, 2009

Related U.S. Application Data

(60) Provisional application No. 61/074,559, filed on Jun. 20, 2008.

(51) Int. Cl.
*H01M 2/00*    (2006.01)
*H01M 2/02*    (2006.01)

(52) U.S. Cl.
USPC .......................................... 429/163; 429/164

(58) Field of Classification Search
USPC .................................................. 429/163, 164
See application file for complete search history.

(56) References Cited

U.S. PATENT DOCUMENTS

| | | |
|---|---|---|
| 2002/0034680 A1 | 3/2002 | Inoue et al. |
| 2003/0027040 A1 | 2/2003 | Asahina et al. |
| 2004/0137322 A1 | 7/2004 | Hong et al. |
| 2005/0042506 A1 | 2/2005 | Tomimoto et al. |
| 2006/0024571 A1 * | 2/2006 | Kim et al. ............... 429/161 |
| 2006/0127759 A1 | 6/2006 | Bechtold et al. |
| 2008/0220316 A1 | 9/2008 | Berkowitz et al. |
| 2009/0246615 A1 | 10/2009 | Park |
| 2009/0297942 A1 | 12/2009 | Jang et al. |

FOREIGN PATENT DOCUMENTS

| | | |
|---|---|---|
| CN | 1246734 A | 3/2000 |
| CN | 1992417 A | 7/2007 |
| EP | 1 804 311 A1 | 7/2007 |
| JP | 04-162351 A | 6/1992 |
| JP | 08-293299 A | 11/1996 |
| JP | 08-293299 A | 11/1996 |
| JP | 2000-285898 A | 10/2000 |
| JP | 2000-331717 | 11/2000 |
| JP | 2002-352789 | 12/2002 |
| JP | 2004-022363 | 1/2004 |
| JP | 2004-071266 | 3/2004 |

(Continued)

OTHER PUBLICATIONS

Office Action dated Apr. 25, 2011 for corresponding CN Application No. 200910149372.X.

(Continued)

*Primary Examiner* — Joseph Kosack
(74) *Attorney, Agent, or Firm* — Knobbe, Martens, Olson & Bear, LLP (57) ABSTRACT

A rechargeable battery is provided. The rechargeable battery comprises an electrode assembly, a case housing the electrode assembly, at least one lead tab accommodated in the case to electrically connect the electrode assembly to the case, and a welded joint joining the lead tab to the case. In the rechargeable battery, the case is connected to the lead tab without producing any spatter within the case. The welded joint extends from an outer bottom surface of the case to the lead tab. Further provided is a method for manufacturing the rechargeable battery.

11 Claims, 8 Drawing Sheets

(56) References Cited

FOREIGN PATENT DOCUMENTS

| | | |
|---|---|---|
| JP | 2004-158318 A | 6/2004 |
| JP | 2004214175 | 7/2004 |
| JP | 2004-303618 | 10/2004 |
| JP | 2005-044691 | 2/2005 |
| JP | 2005-149909 | 6/2005 |
| JP | 2006-040775 | 2/2006 |
| JP | 2006-073457 | 3/2006 |
| JP | 2006-324049 A | 11/2006 |
| KR | 1020050122682 | 12/2005 |
| KR | 1020060103030 | 9/2006 |
| KR | 1020060112393 | 11/2006 |
| KR | 1020060113802 | 11/2006 |
| KR | 1020070033834 | 3/2007 |
| KR | 1020070042033 | 4/2007 |
| KR | 1020070097151 | 10/2007 |

OTHER PUBLICATIONS

Office Action dated Mar. 1, 2011 in corresponding KR Application No. 10-2009-0029757.

Office Action dated Jan. 31, 2012 for corresponding Japanese Application No. 2009-129151.

Korean Office Action dated Nov. 23, 2011 for corresponding Korean Application No. 10-2009-0029757, 9 pages.

Notice of Allowance dated Jul. 8, 2013 for corresponding KR Application No. 10-2009-0029757.

\* cited by examiner

RECHARGEABLE BATTERY AND MANUFACTURING METHOD THEREOF

RELATED APPLICATIONS

This application claims the benefit of U.S. Provisional Application No. 61/074,559, filed Jun. 20, 2008, entitled RECHARGEABLE BATTERY AND MANUFACTURING METHOD THEREOF, which is hereby incorporated by reference in its entirety.

BACKGROUND OF THE INVENTION

1. Field of the Invention

The present invention relates to a rechargeable battery and a method for manufacturing the same. More specifically, the present invention relates to a rechargeable battery in which a case is connected to at least one lead tab in a manner that reduces the introduction of residue or spatter within the case, and a method for manufacturing the rechargeable battery.

2. Description of the Related Art

In a typical lithium-ion rechargeable battery, an electrode assembly and an electrolyte are housed and sealed in a case. Lithium-ion rechargeable batteries are divided into two types, i.e. can-type and pouch-type lithium-ion rechargeable batteries, by the kind of case materials employed.

For example, a can-type lithium-ion rechargeable battery comprises an electrode assembly and a metal case electrically connected to a cathode or an anode of the electrode assembly.

The electrode assembly is electrically connected to the case by a lead tab. The connection between the case and the lead tab is achieved by any suitable process, mostly by resistance welding.

The resistance welding process, however, is problematic because weld spatter is produced which can cause shorting of the electrode assembly.

When it is intended to improve the conductivity between the electrode assembly and the case, two or more partially overlapping lead tabs are often used. In that case, resistance welding is often performed to connect the individual lead tabs to the case, which lengthens the manufacturing time and makes the manufacturing process more complex.

Further, low resistance between the case and the lead tabs can lead to the formation of a defective welded joint during resistance welding. Often, the materials forming the leads have low resistance which reduces the heat generated thereby producing less effective welds.

BRIEF SUMMARY OF THE INVENTION

It is one object of the present invention to provide a rechargeable battery in which a case is connected to at least one lead tab while reducing or even eliminating the production of residue or spatter within the case, and a method for manufacturing the rechargeable battery.

It is another object of the present invention to provide a rechargeable battery in which a case is connected to two or more lead tabs without substantially increasing the number of manufacturing steps, and a method for manufacturing the rechargeable battery.

It is still another object of the present invention to provide a rechargeable battery in which a welded joint with good weldability is formed without the consideration of the contact resistance between a case and at least one lead tab, and a method for manufacturing the rechargeable battery.

In one aspect the invention comprises a battery assembly comprising: a case formed of a conductive material that has an outer surface and defines an interior volume and has a first surface. The assembly in this aspect further comprises an electrode assembly having a first electrode and a second electrode and a separator that is interposed between the first electrode and the second electrode wherein the electrode assembly is positioned within the interior volume of the case. The assembly in this aspect further comprises at least one conductive element that is coupled to the second electrode, wherein the at least one conductive element is welded to the first surface at a first location wherein the weld is formed from the outside of the case. In another aspect, the weld is formed so as to be larger at the outside of the case and having a decreasing cross-sectional dimension as it extends into the case.

In another aspect, the invention comprises a method of forming a battery assembly, which comprises providing an electrode assembly having a positive and negative electrode with a separator interposed therebetween and connecting at least one conductive element to the electrode assembly. The method further comprises positioning an electrode assembly having a positive and negative electrode and a separator interposed therebetween within a case and contacting the at least one conductive element to the first surface of the case. Lastly, in this aspect the method comprises welding the case to the first end of the at least one conductive element wherein the welding is applied from the exterior of the case so as to inhibit the introduction of spatter into the electrode assembly.

The present invention will be more apparent from the following detailed description taken in conjunction with the accompanying drawings.

BRIEF DESCRIPTION OF THE DRAWINGS

FIG. 1b is an assembled perspective view of the rechargeable battery of FIG. 1a;

FIG. 3b is a bottom view of the rechargeable battery of FIG. 3a; FIGS. 4b through 4d illustrate the manufacturing steps according to the flow chart of FIG. 4a.

Common reference numerals are used throughout the drawings and the detailed description to indicate the same elements.

DETAILED DESCRIPTION OF THE INVENTION

Preferred embodiments of the present invention will now be described with reference to the accompanying drawings. Common reference numerals are used throughout the drawings and the detailed description to indicate the same elements, and repeated explanation of such elements will be omitted. In the following embodiments, description of the same or similar effects and functions will be omitted to avoid duplication.

As illustrated in FIGS. 1a through 1d, the rechargeable battery 100 comprises an electrode assembly 110, a case 120, a lead tab 130 and a welded joint 140. The rechargeable battery 100 further comprises an upper insulating or isolating plate 150 and a lower insulating or isolating plate 160.

Figure 1A:
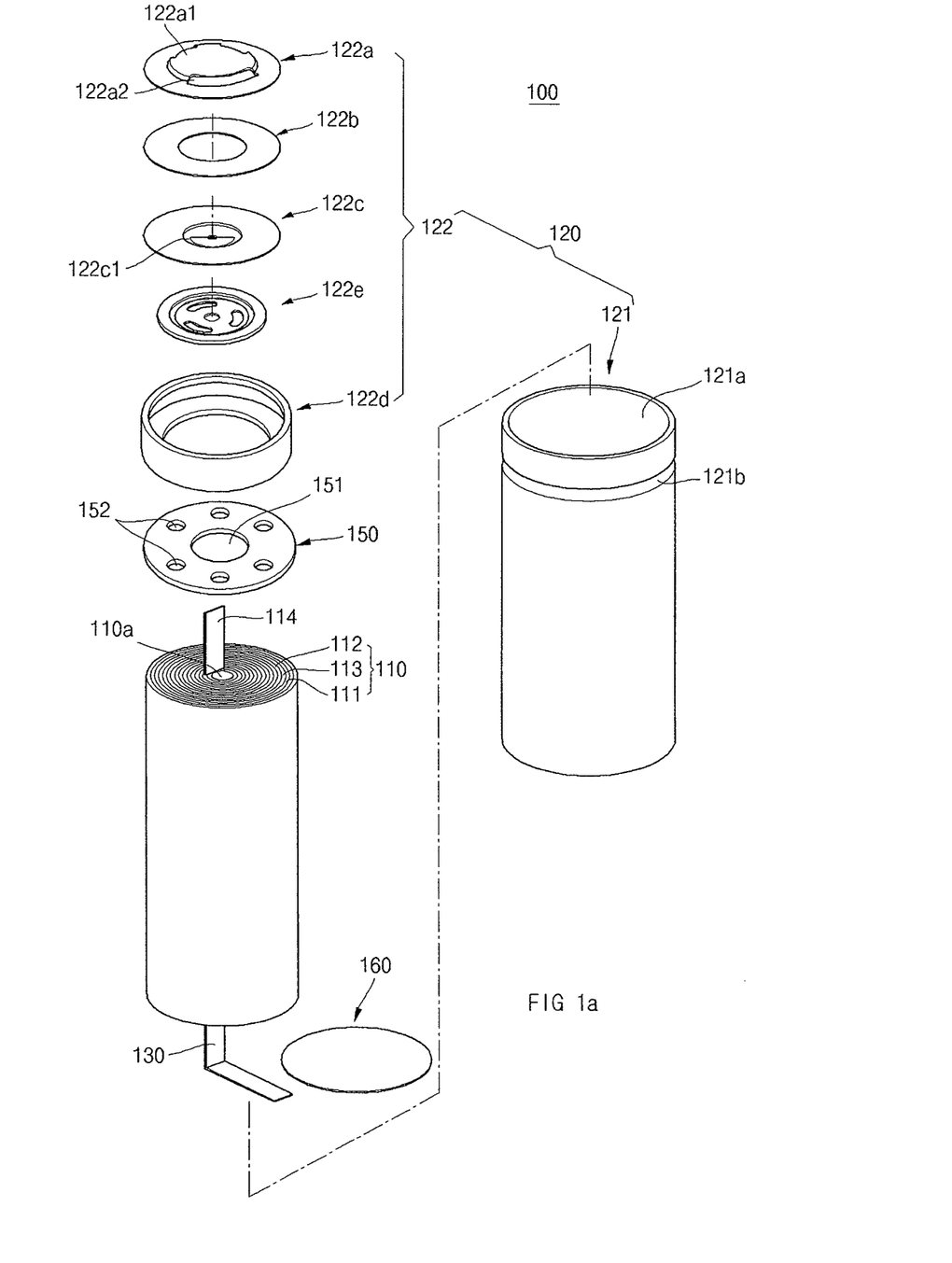
FIG. 1a is an exploded perspective view of a rechargeable battery according to an embodiment of the present invention.
Figure 1B:
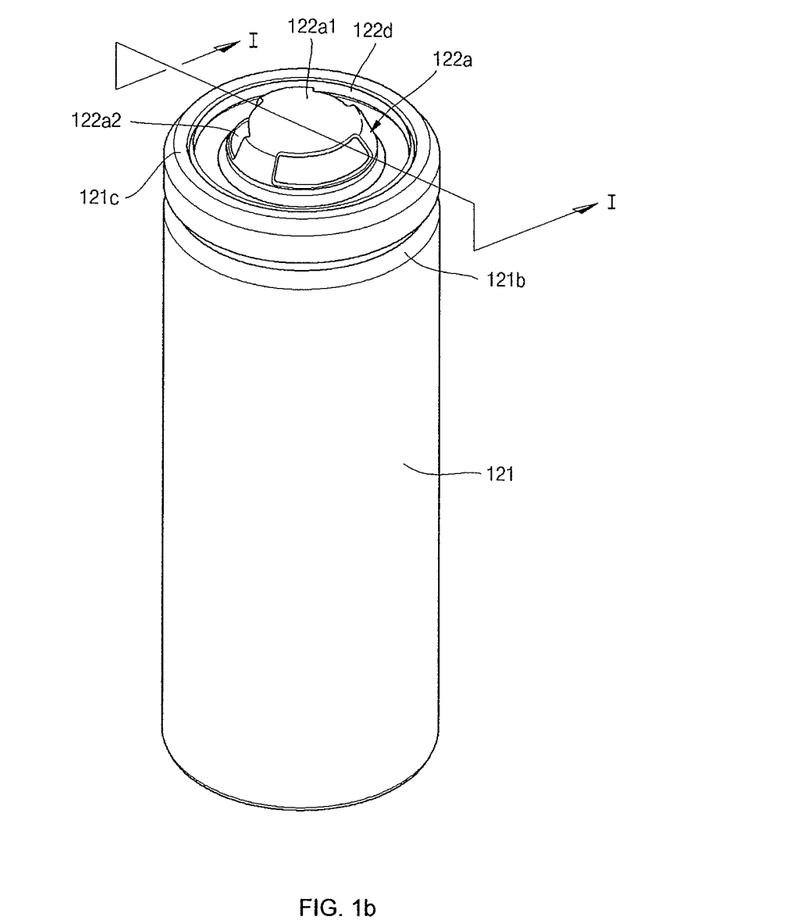

The electrode assembly 110 includes a positive electrode plate 111, a negative electrode plate 112 and a separator 113. The separator 113 is interposed between the positive electrode plate 111 and the negative electrode plate 112 to separate the two electrode plates. The positive electrode plate 111, the negative electrode plate 112 and the separator 113 are rolled in the form of a 'jelly roll' to construct the electrode assembly 110. A passage 110a is formed at the central portion of the electrode assembly 110.

The positive electrode plate 111 is composed of a positive electrode collector and a positive electrode active material layer. The positive electrode active material layer may be formed of a layered compound containing lithium, a binder serving to improve the bonding between the cathode active material particles and a conductive material serving to improve the conductivity of the positive electrode active material layer. The positive electrode collector is typically made of aluminum to support the positive electrode active material layer.

The negative electrode plate 112 is composed of a negative electrode collector and a negative electrode active material layer. The negative electrode active material layer contains carbon such as hard carbon or graphite, and a binder serving to improve the bonding between the active material particles. The negative electrode collector is typically made of copper to support the negative electrode active material layer.

The separator 113 is interposed between the positive electrode plate 111 and the negative electrode plate 112 to insulate the positive electrode plate 111 from the negative electrode plate 112 and allow ions to pass therethrough. The separator 113 is generally made of polyethylene (PE) or polypropylene (PP). No limitation is imposed on the material for the separator 113.

The electrode assembly 110 may further include a positive electrode tab 114 attached to the positive electrode plate 111. The positive electrode tab 114 is electrically connected to a sub-assembly 122e. The positive electrode tab 114 may be made of an electrically conductive metal, such as nickel or a nickel alloy.

Figure 1C:
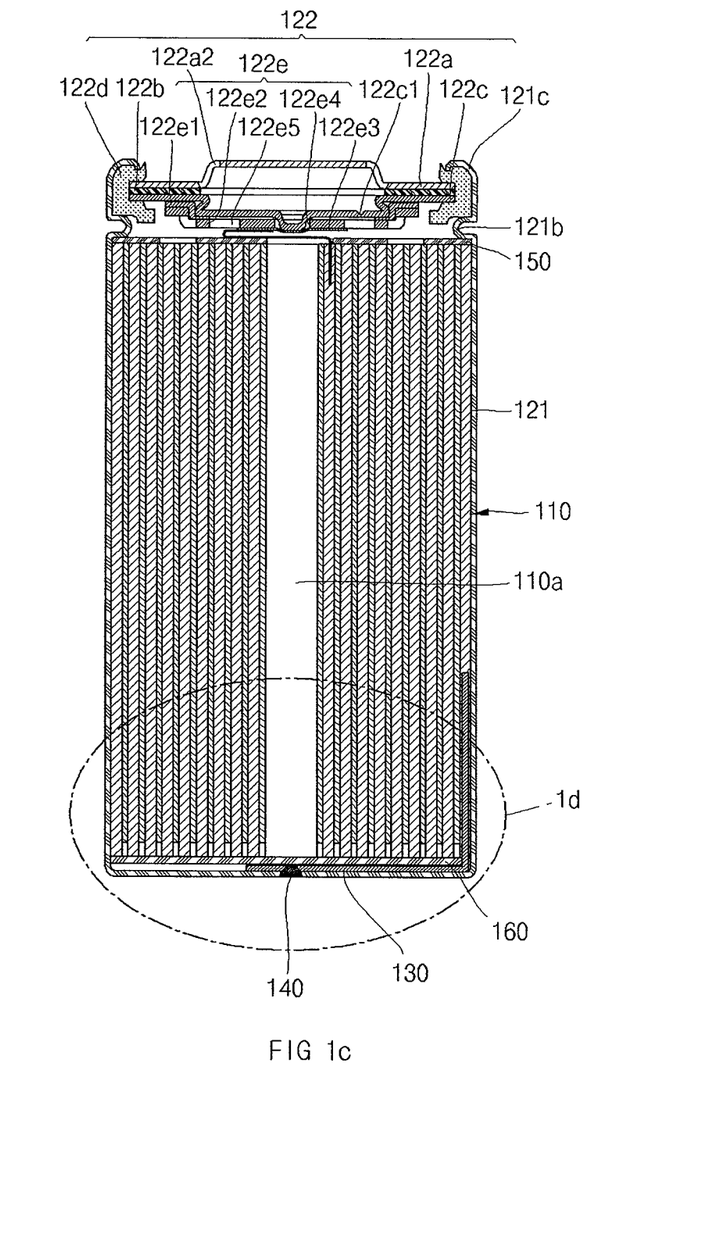
FIG. 1c is a cross-sectional view taken along line I-I of FIG. 1b.

The case 120 includes a can 121 and a cap assembly 122. In this embodiment, the case 120 serves to seal the electrode assembly 110. The case 120 also serves to receive an electrolyte (not shown). It should be understood that although the case 120 is cylindrical in the figures, it may have a polygonal shape in cross section or any of a number of other shapes without departing from the spirit of the present invention.

The can 121 is formed with an opening portion 121a at one end thereof and houses the electrode assembly 110. The can 121 is formed with a beading portion 121b along the outer circumference thereof. The beading portion 121b is designed such that it is recessed inwardly to have a convex structure between the lower end of an insulating gasket 122d and the upper surface of the electrode assembly 110. The opening portion 121a of the can 121 is bent to form a bent portion 121c. The bent portion 121c is brought into contact with the upper peripheral surface of the insulating gasket 122d. The can 121 is made of an electrically conductive metal, such as aluminum or stainless steel, and is electrically connected to the lead tap 130 as a connection member. The lower insulating plate 160 is disposed on the inner bottom surface of the can 121 so that the lower surface of the electrode assembly 110 can be insulated from the inner bottom surface of the can 121.

The cap assembly 122 includes an upper cap or a cap up 122a, a safety element 122b, a safety vent 122c and an insulating gasket 122d. The cap assembly 122 may further include the sub-assembly 122e.

The cap up 122a has a circular protrusion 122a1 protruding from the center thereof. The cap up 122a has a plurality of gas vent holes 122a2 formed at the circular circumference of the circular protrusion 122a1 to exhaust gases. The cap up 122a is made of a metal, such as stainless steel, and can be electrically connected to the safety element 122b.

The safety element 122b is disposed between the cap up 122a and the safety vent 122c. The safety element 122b is in the form of a circular ring and electrically connects the cap up 122a to the safety vent 122c. In this embodiment, the safety element 122b may be a PTC thermistor. When the temperature of the rechargeable battery rise above the critical value, the safety element 122b blocks a flow of current between the cap up 122a and the safety vent 122c to protect the rechargeable battery from overheating and possible explosion.

The safety vent 122c is disposed under the safety element 122b. The safety vent 122c has a rupturing recess 122c1. The rupturing recess 122c1 is ruptured when the internal pressure of the rechargeable battery rises to a specified critical value. This rupture allows internal gases of the rechargeable battery to be exhausted through the gas vent holes and protects the rechargeable battery from damage or possible explosion due to an excessive increase in internal pressure.

A portion of the outer circumference of the insulating gasket 122d is bent to cover the outer circumferential surfaces of the cap up 122a, the safety element 122b and the safety vent 122c. Herein, the insulating gasket 122d is integrated with the can 121 by the beading portion 121b and the bent portion 121c of the can 121. In this embodiment, the insulating gasket 122d is made of a resin, e.g., polyethylene terephthalate (PET) or polyethylene (PE), to insulate the can 121 from the constituent elements of the cap assembly 122.

The sub-assembly 122e is disposed under the safety vent 122c.

In this embodiment, the sub-assembly 122e may include an insulating plate 122e1, a main plate 122e2 adhered to the insulating plate 122e1 and a sub-plate 122e3 connected to the main plate 122e2.

The insulating plate 122e1 is disposed between the safety vent 122c and the main plate 122e2 to insulate the safety vent 122c from the main plate 122e2. It is necessary to electrically connect the safety vent 122c to the sub-plate 122e3 without any disturbance. To this end, the insulating plate 122e1 is formed on a portion of the upper surface of the main plate 122e2 to insulate the safety vent 122c from the main plate 122e2.

Protrusions are formed on the lower surface of the main plate 122e2 and have a smaller diameter than the main plate 122e2. A central hole 122e4 is formed between the protrusions. Gas passage holes 122e5 are formed around the central hole 122e4 to smoothly exhaust internal gases from the can 121.

The sub-plate 122e3 is connected under the main plate 122e2 to cover the central hole 122e4 of the main plate 122e2 and is electrically connected to the main plate 122e2. Further, the sub-plate 122e3 is electrically connected to the safety vent 122c and the positive electrode tab 114.

The lead tab 130 is accommodated in the case 120 and electrically connects the negative electrode plate 112 of the electrode assembly 110 to the case 120. The lead tab 130 is bent such that it is inserted between the lower surface of the electrode assembly 110 and the inner bottom surface of the can 121.

The lead tab 130 is made of an electrically conductive metal. Particularly, the lead tab 130 can be made of a material selected from nickel, copper, aluminum, stainless steel and alloys thereof.

Figure 1D:
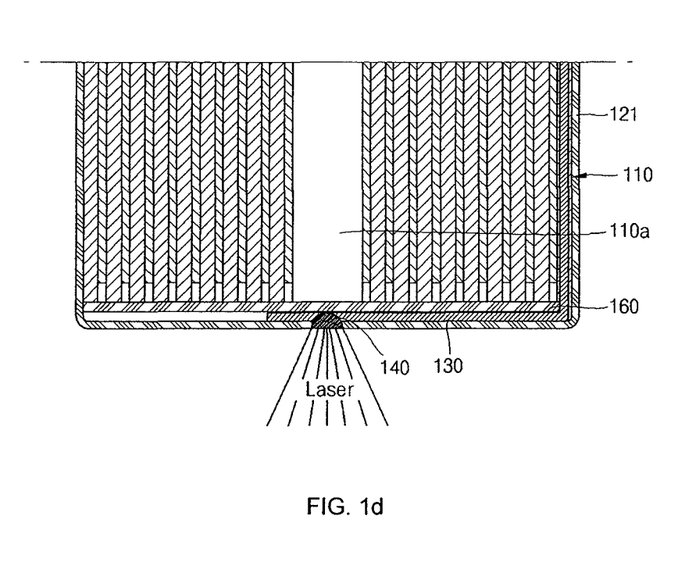
FIG. 1d is a partially enlarged cross-sectional view illustrating region 1d of FIG. 1c.

The can 121 is connected to the lead tab 130 by the welded joint 140. The welded joint 140 forms from an outer bottom surface of the can 121 to the contact area between the can 121 and the lead tab 130. In this embodiment, laser welding is performed on an outer surface of the can 121 to form the welded joint 140. As shown, the welded joint 140 has a greater cross-sectional dimension at the outer surface of the can 120 than at the interior of the can 120 where the lead tab 130 is located.

Although the welded joint 140 is formed at an outer surface of the can 121 in this embodiment, it should be understood that the welded joint 140 may be formed at an outer surface of the cap up 122a of the cap assembly 122. That is, the position of the welded joint 140 in the case 120 may vary depending on where the lead tab 130 is coupled.

The welded joint 140 is formed at the bottom surface of the can 121 opposite to the opening portion of the can 121. The can 121 is electrically connected to the negative electrode plate 112 by the lead tab 130. In this case, the rechargeable battery is connected to another rechargeable battery in series to fabricate a high-voltage battery pack. For example, the lower surface of the can 121 is electrically connected to a cathode of another rechargeable battery. As such, when the rechargeable battery having the welded joint 140 formed at the bottom surface thereof is connected to another rechargeable battery in series, the electrical connection path between the rechargeable batteries is minimized. As a result, the internal resistance of the rechargeable batteries is reduced to prevent the rechargeable batteries from being overheated.

The upper insulating plate 150 is positioned on the upper surface of the electrode assembly 110 to insulate the subassembly 122e from the electrode assembly 110. Further, the upper insulating plate 150 is formed with a hole 151 at the center thereof through which the positive electrode tab 114 passes.

The lower insulating or isolating plate 160 is disposed on the lower surface of the electrode assembly 110. The lower insulating plate 160 is in the form of a circular plate to insulate the lower surface of the electrode assembly 110 from the lead tab 130.

Figure 1E:
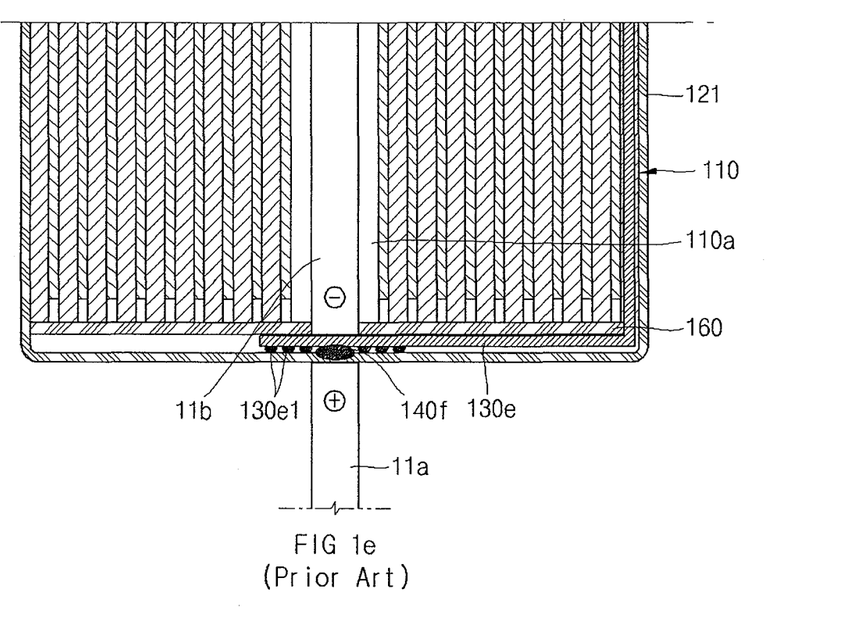
FIG. 1e is a partial cross-sectional view of a conventional rechargeable battery to corresponding to FIG. 1d.

Laser welding is performed on an outer surface of the can 121 to connect the lead tab 130 to the can 121, thereby ensuring improved safety. Referring to FIG. 1e, there is illustrated a partial cross-sectional view of a conventional rechargeable battery for comparison with FIG. 1d. In the conventional rechargeable battery, a resistance-welded joint 140f is formed at the contact area between a can 121 and a lead tab 130e. The resistance-welded joint 140f is formed by the following procedure. First, the lead tab 130e is brought into intimate contact with the can 121 by using a cathode rod 11a and an anode rod 11b. When a current flows through the cathode rod 11a and the anode rod 11b, heat is generated at a portion of the contact area where the contact resistance is highest to melt the portion. As a result, the lead tab 130e is joined to the inner surface of the can 121. A plurality of projections 130e1 are formed under the lead tab 130e to increase the contact resistance between the lead tab 130e and the can 121. The projections 130e' comprise additional spotwelds that are often necessary in resistance welding and can increase the manufacturing costs.

This resistance welding involves the generation of spatter at the welded joint 140f in view of its characteristics. The spatter is a flame composed of hot grains generated when the contact area between the lead tab 130e and the inner surface of the can 121 is molten. The spatter enters a passage 110a and the lower surface of an electrode assembly 110. Particularly, the spatter flies and enters the passage 110a of the electrode assembly 110 which can cause shorting of the electrode assembly 110, resulting in a deterioration in the safety of the electrode assembly 110. Further, the spatter grains are hardened in the form of particles and remain within the can 121 to adversely affect the safety of the electrode assembly 110.

Unlike when resistance welding is performed to form the resistance-welded joint of the conventional rechargeable battery, very little, if any, spatter is produced when laser welding is performed to form the welded joint of the rechargeable battery according to the embodiment of the present invention, thereby ensuring improved safety. In addition, since welding is performed on an outer bottom surface of the can 121 in accordance with the embodiment of the present invention, welding defects are visually discernable in an easier manner.

Figure 2:
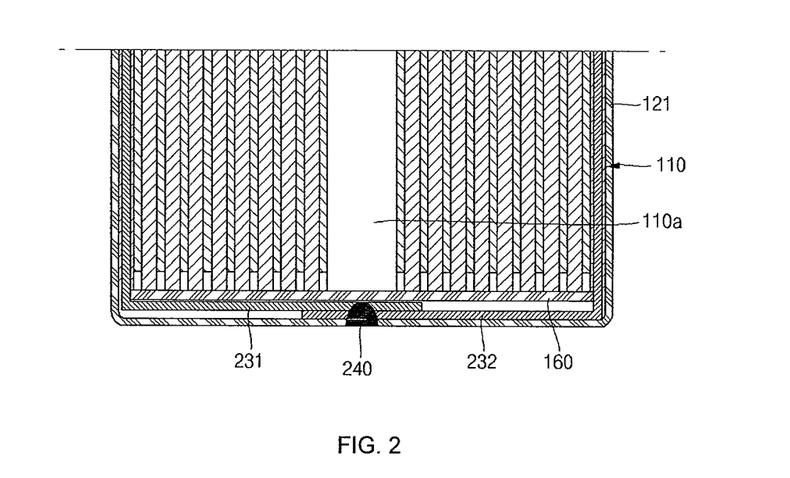
FIG. 2 is a partial cross-sectional view of a rechargeable battery according to another embodiment of the present invention.

FIG. 2 is a partial cross-sectional view of a rechargeable battery according to another embodiment of the present invention.

Referring to FIG. 2, the rechargeable battery comprises an electrode assembly 110, a case 121 (partially shown), first lead tab 231 and second lead tab 232, and a welded joint 240. The electrode assembly 110 and the case 121 are the same as those explained in the previous embodiment and repeated explanation thereof will be omitted. In this embodiment, explanation of the lead tabs 231 and 232 and the welded joint 240 will be given in detail below.

The first and second lead tabs 231 and 232 are electrically connected to a negative electrode plate of the electrode assembly 110. The first and second lead tabs 231 and 232 partially overlap each other. Herein, a welded joint 240 extends from an outer surface of the can 121 to a portion where the lead tabs 231 and 232 overlap each other. Laser welding is performed to form the welded joint 240. Accordingly, the energy and irradiation time of a laser can be varied to control the welding depth from an outer surface of the can 121 to a portion where the lead tabs 231 and 232 overlap each other.

As a result of the laser welding, the electrode assembly 110 is electrically connected to the can 121 because the lead tabs 231 and 232 are electrically connected to the negative electrode plate of the electrode assembly 110.

The first lead tab 231 is made of a material selected from nickel, copper, aluminum, stainless steel and alloys thereof. The second lead tab 232 is made of a material selected from nickel, copper, aluminum, stainless steel and alloys thereof. That is, the welded joint 240 can be formed by laser welding, irrespective of the materials for the lead tabs 231 and 232.

The lead tabs 231 and 232 can partially overlap each other before welding, regardless of their materials. For example, when the first lead tabs 231 and 232 are made of nickel and copper, respectively, they can be welded by laser welding without leaving any defects. In conclusion, the welded joint 240 can be formed, irrespective of the materials for the lead tabs 231 and 232.

Referring back to FIG. 1e, the resistance-welded joint 140f can be formed in a relatively simple manner by welding the single lead tab 130e and the inner surface of the can 121 in view of welding characteristics. When it is desired to weld the overlapping lead tabs 231 and 232 by resistance welding, the welding process becomes very complex. But, in this embodiment, the welded joint 240 is formed by bringing the lead tabs 231 and 232 into contact with the can 121, followed by laser welding to join the lead tabs 231 and 232 to the can 121 in a simple manner.

Figure 3A:
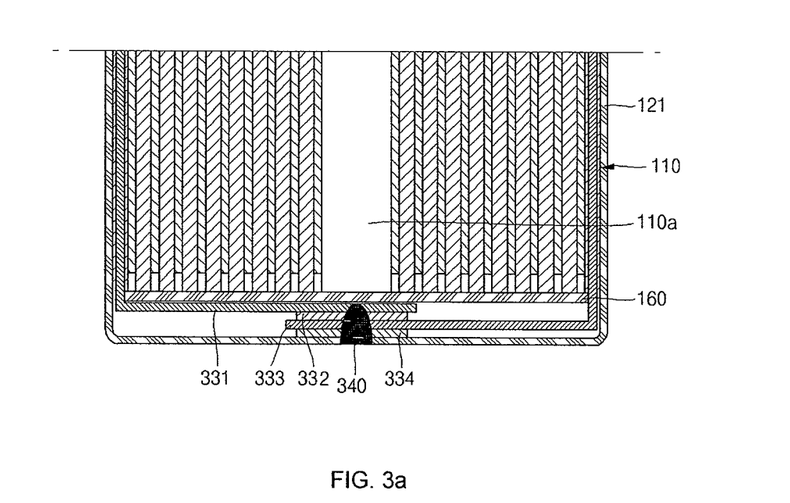
FIG. 3a is a partial cross-sectional view of a rechargeable battery according to another embodiment of the present invention.
Figure 3B:
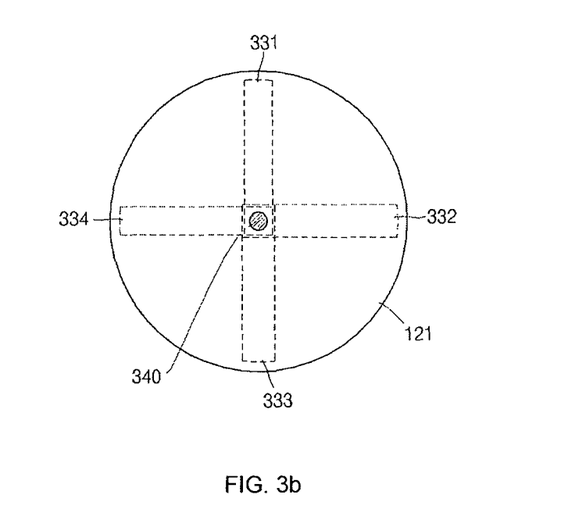

FIG. 3a is a partial cross-sectional view of a rechargeable battery according to another embodiment of the present invention, and FIG. 3b is a bottom view of the rechargeable battery of FIG. 3a.

As illustrated in FIGS. 3a and 3b, the rechargeable battery comprises an electrode assembly 110, a case 121 (partially shown), first, second, third and fourth lead tabs 331, 332, 333 and 334, and a welded joint 340. The electrode assembly 110 and the case 121 are the same as those explained in the previous embodiments and repeated explanation thereof will be omitted. In this embodiment, explanation of the lead tabs 331, 332, 333 and 334 and the welded joint 340 will be given in detail below.

As illustrated in FIG. 3b, the lead tabs 331, 332, 333 and 334 partially overlap one another at a center of the can 121 to form a cross shape. The lead tabs 331, 332, 333 and 334 are attached at regular intervals to a negative electrode plate of the electrode assembly 110.

The welded joint 340 is formed by irradiating a laser on an outer surface of the can 121. As a result, the lead tabs 331, 332, 333 and 334 are melt-fixed on the can 121 by being melted from the outer surface of the can 121 to the first lead tab 331.

In the rechargeable battery, the can 121 is electrically connected to the electrode assembly 110 by the lead tabs 331, 332, 333 and 334. With this configuration, high-output energy can be instantaneously or near instantaneously released from the electrode assembly 110 to the lower surface of the can 121. The reason why the instantaneous energy release is possible is because the plurality of lead tabs 331, 332, 333 and 334 are electrically connected to the can 121 by laser welding on an outer surface of the can 121.

In this embodiment, laser welding is performed on an outer surface of the can 121 to connect the plurality of lead tabs 331, 332, 333 and 334 to the can 121. Therefore, laser welding can be used to form the welded joint in a much simpler manner than resistance welding.

Figure 4A:
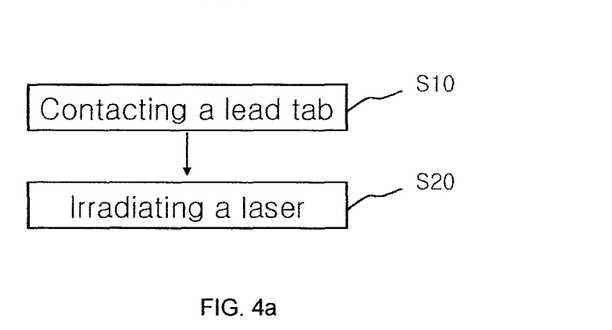
FIG. 4a is a flow chart illustrating a method for manufacturing a rechargeable battery according to an embodiment of the present invention.
Figure 4B:
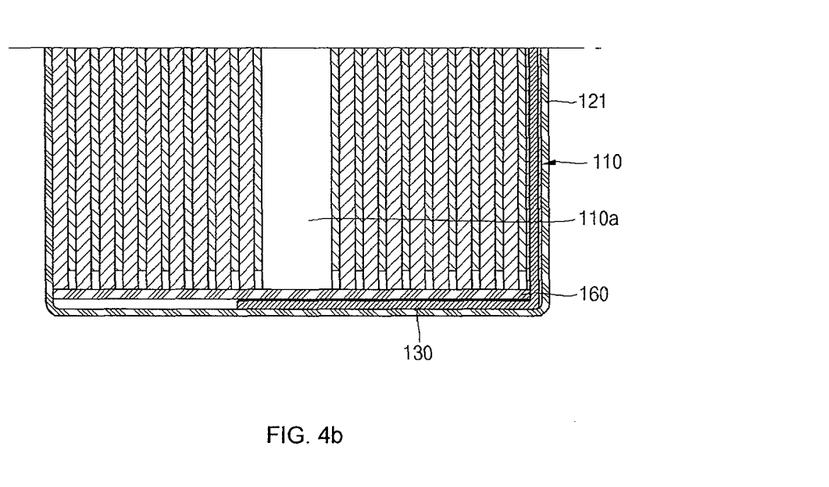
Figure 4C:
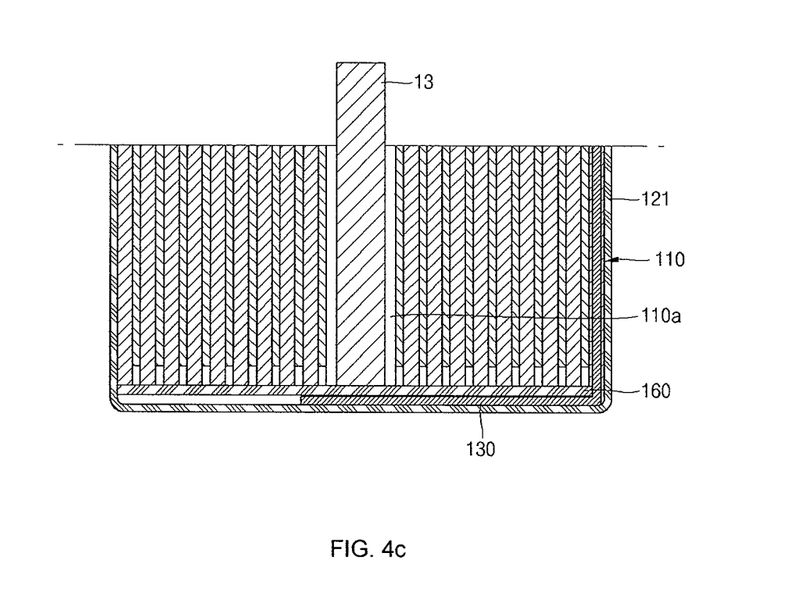
Figure 4D:
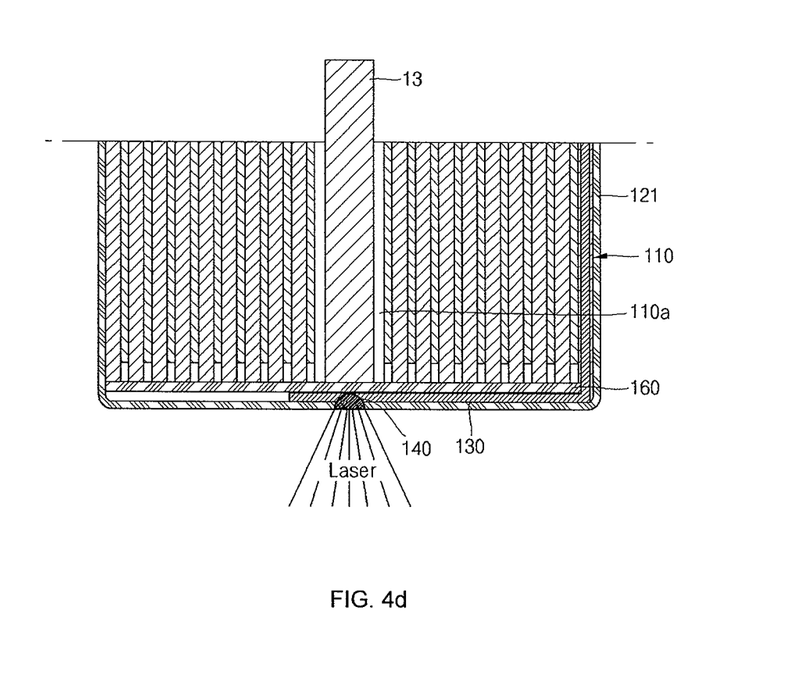

FIG. 4a is a flow chart illustrating a method for manufacturing a rechargeable battery according to an embodiment of the present invention, and FIGS. 4b through 4d illustrate the manufacturing steps according to the flow chart of FIG. 4a. The method will be explained with reference to the rechargeable battery illustrated in FIGS. 1a through 1d.

As illustrated in FIG. 4a, the method comprises the following steps: contacting a lead tab (S10) and irradiating a laser (S20).

As illustrated in FIG. 4b, in step S10, a lead tab 130 is contacted closely to the inner bottom surface of the can 121 formed with an opening portion at one end thereof. The lead tab 130 is connected to an electrode assembly 110 housed in the can 121. As illustrated in FIGS. 2, 3a and 3b, a plurality of lead tabs overlapping on the inner bottom surface of the can 121 can be used instead of the single lead tab 130.

As illustrated in FIG. 4c, in step S10, a pusher 13 is inserted within the can 121 to bring the lead tab 130 into close contact with the inner bottom surface of the can 121. The pusher 13 is introduced through a passage 110a of the electrode assembly 110 and is contacted to lead tab 130.

As illustrated in FIG. 4d, in step S20, a laser is irradiated on an outer bottom surface of the can 121 opposed to the inner bottom surface of the can 121 to which the lead tab 130 is contacted.

In step S20, the welding may be performed by pulse laser welding. The pulse laser welding may be seam laser welding or long-pulse laser welding.

In one cycle of the seam laser welding, the 'ON' time may be set from 0.1 to 10 msec. Specifically, the 'ON' time is adjusted to at least 0.1 msec to sufficiently melt the can 121 and the lead tab 130 and it is adjusted to 10 msec or less to protect the can 121 from excessive melting without leaving any holes. The seam laser welding can be performed several times to make the moldability of the laser-welded joint better.

In one cycle of the long-pulse laser welding, the 'ON' time may be set from 10 to 50 msec. Specifically, the 'ON' time is adjusted to at least 10 msec to sufficiently melt the can 121 and the lead tab 130 and it is adjusted to 50 msec or less to protect the can 121 from excessive melting without leaving any holes. The welded joint can be formed by laser irradiation once for a prolonged time in the laser irradiation time, unlike in the seam laser welding.

The laser energy dose may be in the range of 1 to 100 Joules. Specifically, the laser energy dose is adjusted to at least 1 Joule to form the welded joint reaching the lead tab 130 and it is adjusted to 100 Joules or less to protect the can 121 from excessive melting without leaving any holes.

The instantaneous peak output of the laser energy may be in the range of 1 to 10 KW. Specifically, the instantaneous peak output is adjusted to at least 1 KW to form the welded joint reaching the lead tab 130 and it is adjusted to 10 KW or less to protect the can 121 from excessive melting without leaving any holes.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

What is claimed is:

1. A battery assembly comprising:
   a cylindrical case formed of a conductive material that has an outer surface and defines an interior volume and has a first surface;
   a cylindrical electrode assembly having a first electrode and a second electrode and a separator that is interposed between the first electrode and the second electrode wherein the electrode assembly is positioned within the interior volume of the case;
   a plurality of conductive elements that are coupled to the second electrode, wherein the plurality of conductive elements are welded to the first surface of the case at a first location wherein the weld is formed from the outside of the case; and
   an isolation member, wherein the isolation member covers the first location of the first surface and contacts the at least one conductive element,
   wherein at least a pair of the conductive elements partially overlap one another at the weld so as to form a cross shape.

2. The battery assembly of claim 1, further comprising a cap assembly that is positioned on the case and is coupled to the first electrode wherein the cap assembly is electrically isolated from the case.

3. The assembly of claim 1, wherein the cross-sectional area of the weld is greater at the outer surface of the case than at the at least one conductive element so as to inhibit the introduction of spatter into the electrode assembly.

4. The assembly of claim 1, wherein the weld between the casing and the conductive element comprises a laser weld.

5. The assembly of claim 1, wherein the first surface is a bottom surface.

6. The assembly of claim 1, wherein the first electrode is a positive electrode and the second electrode is a negative electrode.

7. The assembly of claim 1, wherein the case defines at least one side wall and at least one orthogonal surface that is orthogonal to the at least one side wall and wherein the first surface is the at least one orthogonal surface.

8. The assembly of claim 7, wherein the at least one conductive element comprises a lead tab that has a first section that extends substantially parallel to the side wall and a second section that extends substantially parallel to the at least one orthogonal surface wherein the first section of the lead tab is interposed between the isolation member and the at least one side wall and the second section is interposed between the isolation member and the at least one orthogonal surface.

9. The assembly of claim 8, wherein the lead tab is formed out of a material selected from the group consisting of nickel, copper, aluminum, stainless steel and alloys thereof.

10. The assembly of claim 8, wherein the electrode assembly has a first and a second side and the at least one conductive element comprises two lead tabs that are coupled to the first and the second side of the electrode assembly and overlap each other at the first location of the first surface so that the case and the two lead tabs are welded together at the first location.

11. The assembly of claim 8, wherein the electrode assembly comprises a first, a second, a third and a fourth side and the at least one conductive element comprises four lead tabs that are coupled to the first, the second, the third and the fourth side of the electrode assembly and overlap each other at the first location of the first surface so that the case and the two lead tabs are welded together at the first location.

* * * * *